(12) United States Patent
Wilensky (10) Patent No.: US 7,412,105 B2
(45) Date of Patent: Aug. 12, 2008

(54) TONE SELECTIVE ADJUSTMENT OF IMAGES

(75) Inventor: Gregg D. Wilensky, Pacific Palisades, CA (US)

(73) Assignee: Adobe Systems Incorporated, San Jose, CA (US)

( * ) Notice: Subject to any disclaimer, the term of this patent is extended or adjusted under 35 U.S.C. 154(b) by 717 days.

(21) Appl. No.: 10/678,366

(22) Filed: Oct. 3, 2003

(65) Prior Publication Data

US 2005/0074179 A1   Apr. 7, 2005

(51) Int. Cl.
G06K 9/40 (2006.01)
G06K 9/00 (2006.01)
(52) U.S. Cl. ................................ 382/254; 382/167
(58) Field of Classification Search ................ 382/167, 382/254, 274, 309
See application file for complete search history.

(56) References Cited

U.S. PATENT DOCUMENTS

| | | | |
|---|---|---|---|
| 5,446,504 A | 8/1995 | Wada | |
| 5,495,428 A | 2/1996 | Schwartz | |
| 5,793,886 A | 8/1998 | Cok | |
| 6,061,091 A | 5/2000 | Van de Poel et al. | |
| 6,181,815 B1 * | 1/2001 | Marugame | 382/154 |
| 6,191,823 B1 | 2/2001 | Ahn | |
| 6,204,858 B1 | 3/2001 | Gupta | |
| 6,263,101 B1 * | 7/2001 | Klein | 382/162 |
| 6,337,925 B1 * | 1/2002 | Cohen et al. | 382/199 |
| 6,392,764 B1 | 5/2002 | Eschbach et al. | |
| 6,417,891 B1 | 7/2002 | Cacciatore et al. | |
| 6,438,264 B1 | 8/2002 | Gallagher et al. | |
| 6,453,068 B1 * | 9/2002 | Li | 382/167 |
| 6,552,731 B1 | 4/2003 | Gonsalves | |
| 6,594,384 B1 | 7/2003 | Seo et al. | |
| 6,621,937 B1 * | 9/2003 | Adams, Jr. et al. | 382/275 |
| 6,728,421 B2 * | 4/2004 | Kokemohr | 382/284 |
| 6,792,160 B2 | 9/2004 | Shaw et al. | |
| 6,813,335 B2 | 11/2004 | Shinbata | |
| 6,819,794 B2 | 11/2004 | Inoue | |

(Continued)

FOREIGN PATENT DOCUMENTS

WO   WO-2006/028460 A3 *   3/2006

OTHER PUBLICATIONS

Konrad Leszczynski et al., "The enhancement of radiotherapy verification images by an automated edge detection technique," Med. Phys. 19 (3), May/Jun. 1992, pp. 611-621.*

(Continued)

Primary Examiner—Jingge Wu
Assistant Examiner—Jeffrey S Smith
(74) Attorney, Agent, or Firm—Fish & Richardson P.C.

(57) ABSTRACT

Methods, systems and apparatus, including computer program products, for processing an image. A first tone value is determined for a location within the image based upon attributes of pixels within a first neighborhood surrounding the location. The first tone value specifies a local weight for a first tone adjustment in the image. A second tone value is determined for the location based upon attributes of pixels within a second neighborhood surrounding the location. The second tone value specifies a local weight for a second tone adjustment in the image. The image is adjusted at the location using the first and second tone adjustments according to the local weights specified by the first and second tone values, respectively.

42 Claims, 6 Drawing Sheets

U.S. PATENT DOCUMENTS

| | | | |
|---|---|---|---|
| 6,822,762 B2 | 11/2004 | Moroney et al. | |
| 6,856,704 B1* | 2/2005 | Gallagher et al. | 382/263 |
| 6,954,288 B2 | 10/2005 | Uekusa et al. | |
| 6,954,549 B2 | 10/2005 | Kraft | |
| 7,020,332 B2 | 3/2006 | Nenonen et al. | |
| 7,031,547 B2* | 4/2006 | Kokemohr | 382/260 |
| 7,038,810 B1 | 5/2006 | Yamazoe et al. | |
| 7,057,768 B2 | 6/2006 | Zaklika et al. | |
| 7,068,841 B2* | 6/2006 | Luo | 382/167 |
| 7,071,948 B2* | 7/2006 | Wilensky | 345/581 |
| 7,082,211 B2* | 7/2006 | Simon et al. | 382/118 |
| 7,092,573 B2* | 8/2006 | Luo et al. | 382/228 |
| 7,106,900 B2 | 9/2006 | Park et al. | |
| 7,113,648 B1* | 9/2006 | Aihara | 382/274 |
| 7,121,469 B2* | 10/2006 | Dorai et al. | 235/470 |
| 7,127,108 B2* | 10/2006 | Kinjo et al. | 382/203 |
| 7,130,463 B1 | 10/2006 | Spangler | |
| 7,133,553 B2* | 11/2006 | Embler | 382/164 |
| 2002/0141640 A1 | 10/2002 | Kraft | |
| 2002/0186387 A1 | 12/2002 | Moroney et al. | |
| 2003/0001856 A1 | 1/2003 | Sawada et al. | |
| 2003/0099411 A1 | 5/2003 | Kokemohr | |
| 2003/0131237 A1 | 7/2003 | Ameline et al. | |
| 2003/0234960 A1 | 12/2003 | Kaltenbach et al. | |
| 2004/0125983 A1 | 7/2004 | Reed et al. | |
| 2005/0100242 A1 | 5/2005 | Trifonov et al. | |
| 2006/0193515 A1* | 9/2006 | Kim et al. | 382/173 |

OTHER PUBLICATIONS

Stephen Pizer et al., "Adaptive Grey Level Assignment in CT Scan Display," Journal of Computer Assisted Tomography, Apr. 1984, pp. 300-305.*

Stephen Pizer et al., "Adaptive Histogram Equalization and Its Variations," Computer Vision, Graphics, and Image Processing, 39, pp. 355-368 (1987).*

Chang et al., "Optimal Histogram Matching by Monotone Gray Level Transformation", *Communications of the ACM USA*, Oct. 1978, vol. 21, No. 10, pp. 835-840.

King, "Two Adaptive Neural Networks for Image Histogram Processing", *Proceedings to the 1995 International Symposium on Artificial Neural Networks*, 1995, Obtained from the Internet at www.cse.cuhk.edu.hk/~king/PUB/isann95.ps> 6 pages.

Zia-ur Rahman, "A Multiscale Retinex for Color Rendition and Dynamic Range Compression," SPIE International Symposium on AeroSense, Visual Information Processing IX, Apr. 2000.

Gregory Ward Larson, et al, "A Visibility Matching Tone Reproduction Operator for High Dynamic Range Scenes," IEEE Transactions on Visualization and Computer Graphics, vol. 3, No. 4, Oct.-Dec. 1997, pp. 291-306.

Arthur R. Weeks, Jr., *Fundamentals of Electronic Image Processing*, SPIE Optical Engineering Press, USA, 1996, Chapter 3, pp. 90-120.

J. Tumblin and H. Rushmeier, "Tone Reproduction for Realistic Images," IEEE Computer Graphics and Applications, Nov. 1993, 13(6), 42-48.

Gonzalez et al., "Digital Image Processing", Prentice Hall, 2001, pp. 94-103.

"Single Click Fixes in Photoshop Album", http://www.dummies.com/WileyCDA/DummiesArticle/id-2039.html, Adapted from Photoshop Album for Dummies Wiley Publishing, Inc., Jul. 2003, 6 pages.

"Using Adobe Photoshop's "Auto Contrast" Feature", http://www.lonestardigital.com/autocontrast.htm, Copied from Adobe Magazine/May-Jun. 2000, 5 pages.

"Adjusting Brightness and Contrast", http://support2.epson.net/manuals/english/scanner/perfection2450photo/REF_G/OPTMZ_2.HTM, Version 1.00E, 2002, Seiko Epson Corporation, 11 pages.

"Digital Sho Plug-In", http://www.asf.com/products/plugins/sho/pluginSHO.asp, 2001-2003, Eastman Kodak Company, 2 pages.

"Highlight Midtone and Shadow", http://www.caisse.com.au/pituts/hmsarticle/hms01.htm, 2003, Caisse, 11 pages.

Fraser, "Out of Gamut: Don't Underestimate Photoshop's Auto Color", http://www.creativepro.com/story/feature/17164.html, Jul. 23, 2002, Creativepro.com, 12 pages.

* cited by examiner

TONE SELECTIVE ADJUSTMENT OF IMAGES

BACKGROUND

The present invention relates to image processing.

An electronic image, such as a digital image, can be represented by an array of closely packed pixels that are basic picture elements. Each pixel represents a local portion of the image and alone or together with other pixels, determines graphical attributes for the local portion. The graphical attributes can include color, gray-level, luminosity or transparency. Electronic images can be generated by graphical software applications or electronic devices such as scanners or digital cameras. The graphical software applications can include presentation, animation, painting and design applications. The generated image can be further processed by the same or another device or application. During image processing, graphical attributes can be adjusted at the pixels of the image to achieve various visual effects. For example, the adjustments can alter brightness, contrast or color in the image.

SUMMARY

An image is adjusted at a location within the image according to multiple tone values that specify weights for corresponding tone adjustments based on graphical attributes within a neighborhood of the location. In general, in one aspect, the invention provides methods and apparatus, including computer program products, for processing an image. A first tone value is determined for a location within the image based upon attributes of pixels within a first neighborhood surrounding the location. The first tone value specifies a local weight for a first tone adjustment in the image. A second tone value is determined for the location based upon attributes of pixels within a second neighborhood surrounding the location. The second tone value specifies a local weight for a second tone adjustment in the image. The image is adjusted at the location using the first and second tone adjustments according to the local weights specified by the first and second tone values, respectively.

Particular implementations can include one or more of the following features. The first tone value or the second tone value can be determined based upon a neighborhood intensity that is a measure of values of a local attribute specified by pixels within the first or second neighborhood, respectively. For each pixel in the corresponding neighborhood, the value of the local attribute can depend on luminosity, a maximum color value or a weighted average of a luminosity and a maximum color value of the pixel. The neighborhood intensity can be determined by averaging the values of the local attribute for pixels within the corresponding neighborhood. Averaging the values of the local attribute for pixels within the corresponding neighborhood can include averaging the values of the local attribute according to different weights. The weights for averaging can include gaussian weights that are assigned to each pixel in the neighborhood based upon a distance between the pixel and the location, or weights that are assigned to each pixel in the neighborhood based upon a difference between the local attribute at the pixel and the location. User input can be received for selecting a range of the local attribute for which the first or second tone value is substantially different from a reference value. The first or second tone value can be specified by a first or second tone function of the neighborhood intensity, respectively, and user input can be received for specifying a functional shape for the first or second tone function. The first neighborhood and the second neighborhood can be substantially identical. A graphics object can be identified within the image. The location may lie inside the graphics object and the first and second neighborhoods can be restricted inside the graphics object. Identifying the graphics object can include identifying lines or edges in the image.

One or more additional tone values can be determined for the location. Each of the additional tone values can specify a local weight for a corresponding tone adjustment in the image. Adjusting the image at the location can include using each of the additional tone adjustments according to the corresponding tone value. At least one of the additional tone values can be determined based on the first and second tone values. User input can be received for specifying a characteristic size of the first neighborhood or the second neighborhood. Or user input can be received for specifying a strength for the first or second tone adjustment. The first and second tone adjustments can be related to each other by a negative symmetry.

In general, in another aspect, the invention provides a system for image processing. The system includes a local adjustment tool to adjust an image including a plurality of pixels. The local adjustment tool includes two or more tone components. Each tone component specifies a tone adjustment and is configured to determine a tone value for a location within the image based upon attributes of pixels within a neighborhood surrounding the location. Each tone value specifies a local weight for the corresponding tone adjustment. The local adjustment tool is configured to adjust the image at the location using the tone adjustments according to the local weights specified by the corresponding tone values.

Particular implementations can include one or more of the following features. The system can include an image capturing device to generate the image. The image capturing device can includes a digital camera or a scanner. The system can include a display device to display the image. The display device can be implemented in a portable device. At least one of the tone components can specify an adjustment parameter for the corresponding tone adjustment, and the system can include a user interface to set a value for the adjustment parameter.

The invention can be implemented to realize one or more of the following advantages. Lighting problems can be corrected in an electronic image such as a digital photograph. For example, brightness can be corrected at one or more locations within the image based on local neighborhoods of the locations. Different tonal regions such as shadows and highlights can be separately controlled. For example, contrast can be increased for shadows without affecting the highlights and vice versa. Thus dark regions can be brightened without affecting regions that are already bright. Under or overexposed regions can be corrected in a photograph essentially without altering contrast in correctly exposed regions. The correction can be performed without manually selecting a mask to define a region to be corrected. A user can specify different corrections for different tonal regions such as shadows and highlights. The different tonal regions can be corrected differently (and optionally, at the same time). In the image, each location can be adjusted based on a neighborhood surrounding the location. The user can set a neighborhood size such as a radius of the neighborhood. The neighborhood can be restricted to pixels that represent the same object and/or have similar luminance values. This way, a wide range of intensities in luminance can be accommodated in the image while large contrasts are maintained in both highlight and shadow regions.

The details of one or more implementations of the invention are set forth in the accompanying drawings and the description below. Other features and advantages of the invention will become apparent from the description, the drawings and the claims.

BRIEF DESCRIPTION OF THE DRAWINGS

Like reference numbers and designations in the various drawings indicate like elements.

DETAILED DESCRIPTION

Figure 1:
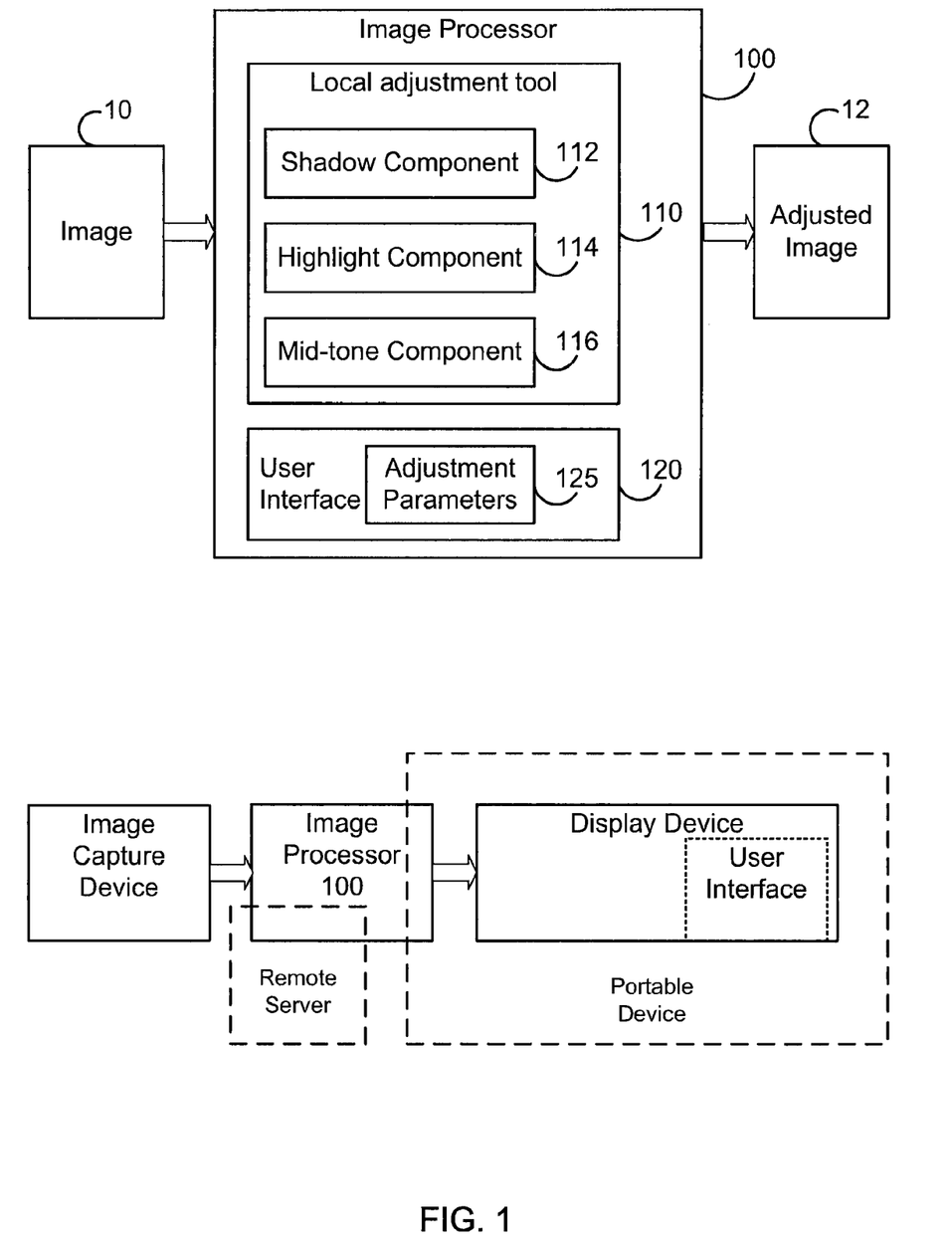
FIG. 1 is a schematic diagram illustrating an image processor for tone selective adjustments in an image.

FIG. 1 illustrates an image processor 100 for tone selective adjustments. The image processor 100 receives an electronic image 10 and adjusts local graphical attributes in one or more regions in the image 10 to generate an adjusted image 12. The adjusted graphical attributes can include pixel attributes specifying color, gray-level, luminance or transparency. In one implementation, the image 10 is a digital image in which pixel attributes are specified by numerical values in a bitmap. For digital images, the image processor 100 can be implemented in one or more software applications or as a plug-in of a software application.

The image processor 100 can also be implemented in electronic devices, such as image capturing or displaying devices. The image capturing devices can include digital cameras, CCD devices or scanners. The image processor 100 can also provide feedback to an image capturing device that, based on the feedback, can locally adjust sensitivity to generate the adjusted image. The image displaying devices can be portable devices, such as personal digital assistants or mobile phones. For portable devices, the image processor 100 or portions of it can be implemented on a remote server. In electronic devices, the received image can be specified by digital or analog electronic signals. For analog electronic images, the received image can be digitized before processing. Alternatively, the image processor 100 or portions of it can be implemented by analog data processing apparatus.

The image processor 100 includes a local adjustment tool 110 and a user interface 120 to receive user input for the local adjustment tool 110. The local adjustment tool 110 can be used to adjust local graphical attributes at a location in the image 10. To adjust the image 10 at multiple locations, the image processor 100 can apply the local adjustment tool 110 to each of the multiple locations. Alternatively, the image processor 100 can include multiple local adjustment tools.

The local adjustment tool 110 includes a separate tone component for each of multiple tones. A tone is a classification of a neighborhood of a location based on effects of light, color and shade in the neighborhood. The neighborhood is a region surrounding the location within the image. Tones such as shadow, highlight and midtone classify luminosity in the neighborhood, and represent dark, bright and average luminosity, respectively. Optionally, tones can represent a finer classification of luminosity. For example, shadows can be classified by multiple tones such as deep-shadow, mid-shadow and light-shadow. Alternatively or in addition to luminosity, tones can be based on chromacity. For example, color saturation can be classified by an over-saturated tone and an under-saturated tone or color hue can be classified by red, green and blue tones (representing reddish, greenish and bluish neighborhoods, respectively).

In the implementation shown in FIG. 1, the local adjustment tool 110 includes a shadow component 112, a highlight component 114 and a midtone component 116 corresponding to the tones of shadow, highlight and midtone, respectively. Each tone component determines a tone value based on attributes of pixels in a neighborhood surrounding a location in the image 10, where the determined tone value represents the extent to which pixel attributes in the neighborhood are characterized by the tone of the tone component. For example in the same dark neighborhood, the shadow component 112 determines a large shadow tone value and the highlight component 114 determines a small highlight tone value.

The shadow 112, highlight 114 and midtone 116 components specify adjustments for the tones of shadow, highlight and midtone, respectively. Each of the tone adjustments can be used to adjust the image at the location. In one implementation, the image is adjusted at the location using all the tone adjustments specified by all the tone components 112-116 where a relative weight for each the tone adjustments is determined according to the corresponding tone value. An exemplary tone component is discussed with reference to FIG. 2. Using tone components for local adjustment is further discussed with reference to FIGS. 3 and 4.

The user interface 120 can receive a user input that sets one or more of adjustment parameters 125 for the local adjustment tool 110. For example, the user interface 120 can include a GUI presenting dialog boxes or sliders to a user of the image processor 100. Or the user interface 120 can receive and process voice control from the user. The adjustment parameters 125 can include separate parameters for each of the tone components 112-116. Thus the user can specify an adjustment strength for a tone component independent of other tone components. Optionally, the user can specify different neighborhood sizes for determining tone values by different tone components. Furthermore, the user can specify how a tone value depends on pixel attributes in the corresponding neighborhood. For example, the user can specify a range of neighborhood luminosities for which a shadow (or highlight) tone value is substantially different from zero or other reference level. Thus the user can have a precise control over local adjustments. For example, the user can adjust shadows without substantially altering other tones, such as highlights. (A small effect upon other tones can be introduced to avoid artifacts near edges separating different tones in the image.)

The user interface 120 can include a tool that allows the user to store one or more user settings for the adjustment parameters 125 and to select from previously stored user settings. The user interface 120 can also provide suggested settings of the adjustment parameters 125 for different levels of correction, such as settings for correcting small, medium or large over or underexposures in the image 10. The user interface 120 can display one or more previews that show the image 10 adjusted according to different settings of the adjustment parameters 125.

Figure 2:
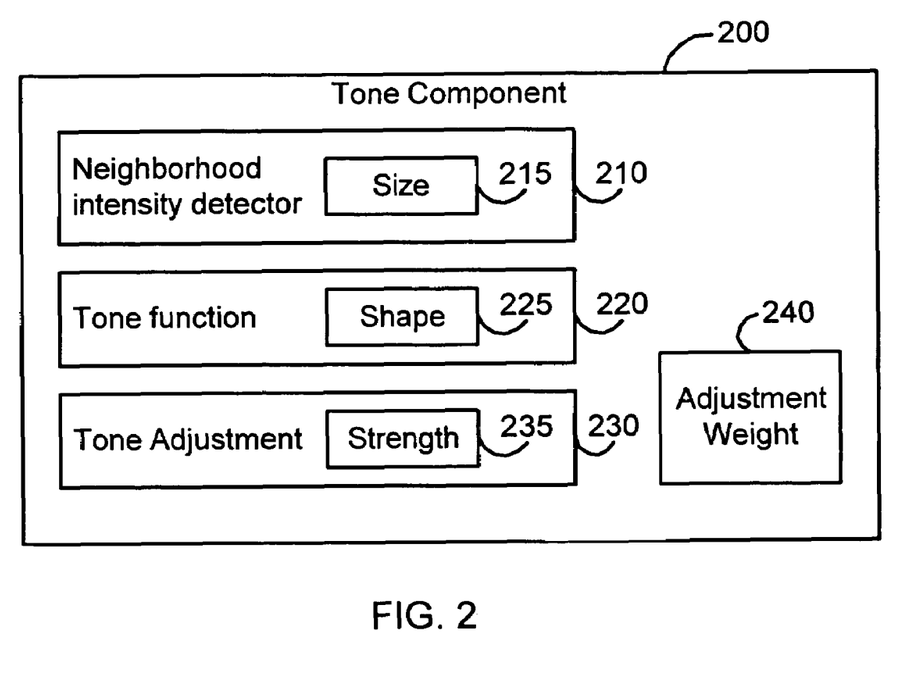
FIG. 2 is a schematic diagram illustrating a tone component for an image processor.

FIG. 2 illustrates a tone component 200 for adjusting an electronic image such as a digital image. The tone component 200 can be included in an image processor as a tone component in the local adjustment tool 110 for adjusting the image at a location. The tone component 200 corresponds to a particular tone. For example the tone component 200 can be a shadow (112), a highlight (114) or a midtone (116) component.

The tone component 200 includes a neighborhood intensity detector 210, a tone function 220, a tone adjustment 230 and an adjustment weight 240. The neighborhood intensity detector 210 calculates a neighborhood intensity based upon a graphical attribute (such as luminosity) of pixels in a neighborhood surrounding a location in the image. The tone function 220 determines a tone value based on the neighborhood intensity. The adjustment weight 240 is based on the determined tone value, and specifies an amplitude for the tone adjustment 230. When one or more other tone adjustments are used to adjust the image at the location, the adjustment weight 240 specifies an amplitude for the tone adjustment 230 relative to amplitudes of the other tone adjustments.

The neighborhood intensity detector 210 calculates a neighborhood intensity. The neighborhood intensity is a measure of values of a local attribute specified by pixels in a neighborhood surrounding a location within the image. For example, the neighborhood intensity can be based on an average luminosity of pixels in the neighborhood. A neighborhood size 215 specifies the extent of the neighborhood that contributes to the neighborhood intensity, as calculated by the neighborhood intensity detector 210. The neighborhood size 215 can be a characteristic size, such as a radius of a circular neighborhood or one or more sides of a square or rectangular neighborhood. Optionally, the neighborhood size 215 can explicitly specify the number of pixels in the neighborhood. The neighborhood size 215 can be a preset value specified in absolute units or as a fraction relative to the size of the image. Alternatively, the neighborhood size 215 can be specified by user input received through the user interface 120 (FIG. 1). In one implementation, the extent of the neighborhood also depends on local attributes (such as luminosity) of pixels surrounding the location. Methods for specifying neighborhoods and calculating neighborhood intensities are further discussed with reference to FIG. 4.

Figure 5A:
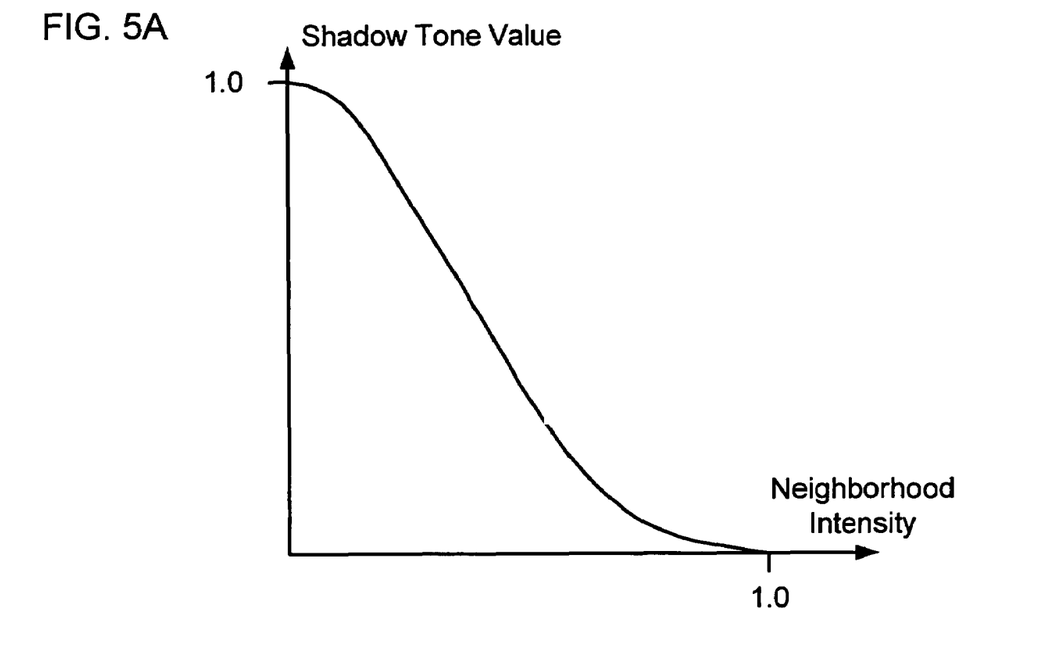
FIGS. 5A and 5B are schematic diagrams illustrating exemplary tone functions for tone selective adjustments.
Figure 5B:
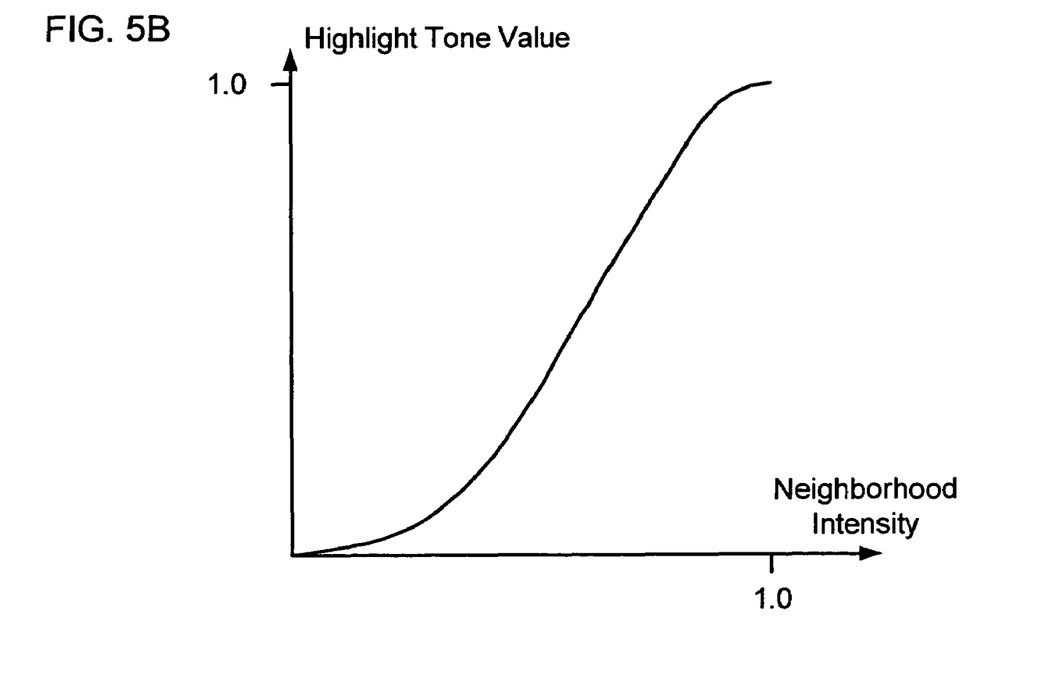

The tone function 220 specifies a tone value based on the neighborhood intensity calculated by the neighborhood intensity detector 210. The tone value represents how much the neighborhood is characterized by the tone of the tone component 200. The tone value can be a number between zero and one, indicating the degree of the tone in the neighborhood. A tone value of about zero indicates that the neighborhood does not have the tone, and a tone value of about one indicates that the neighborhood is characterized by the tone. Exemplary tone functions are illustrated in FIGS. 5A and 5B.

In alternative implementations, a tone value can be specified for a neighborhood surrounding a location based upon one or more other tone values for neighborhoods surrounding the same location. For example, a midtone component can determine a midtone tone value based on shadow and highlight tone values for neighborhoods surrounding the same location.

The tone function 220 includes and depends upon one or more shape parameters 225. For example, the shape parameters 225 can include a central tone or a tonal width that defines a range of neighborhood intensity values for which the tone function 220 gives substantially non-zero tone values. Alternatively or in addition, the shape parameters 225 can include a steepness parameter that defines a steepness of the tone function. That parameter can define the size of the region where the tone values drop from about one to about zero.

Each of the shape parameters 225 can have one or more default values. For example, there can be a first default value for correcting an overexposed photograph and a second default value for correcting an underexposed photograph. The tone component 200 can select the first or the second default value based on user input. Optionally, the tone component 200 can analyze the image to determine one or more of the shape parameters 225 (or to select from multiple default values). For example, the tone component 200 can calculate an average, a minimum or a maximum luminosity for the entire image, and then determine one or more of the shape parameters 225 based on the calculated luminosity. The user also can be allowed to modify one or more of the shape parameters 225 using the user interface 120 (FIG. 1).

The tone adjustment 230 defines a tone specific adjustment to one or more local attributes of a pixel. In one implementation, the tone adjustment 230 defines one or more mappings of local attributes, such as a color, luminance, saturation or a gray value at the pixel. Each mapping assigns an adjusted value to a current pixel value of a local attribute. Using these mappings, the tone adjustment 230 can define a tone specific adjustment to contrast, brightness, saturation or color balance. The tone adjustment 230 can also define a local filter, such as a filter for sharpening or blurring the image.

One or more strength parameters 235 specify an amount of change caused by the tone adjustment 230. The strength parameters 235 can specify deviations from an identity mapping that corresponds to a lack of adjustment. For example, the strength parameters 235 can specify a slope other than unity for a linear mapping. Alternatively, the strength parameters can specify parameters for non-linear mappings (such as an exponent for a power law mapping). Similar to the shape parameters 225, the strength parameters 235 can be selected from default values or a user can specify one or more of the strength parameters 235 through the user interface. Exemplary mappings for different tones are discussed with reference to FIGS. 6A and 6B.

The adjustment weight 240 specifies an amplitude for the tone adjustment 230. The adjustment weight 240 can be used to combine the tone adjustment 230 with one or more other tone adjustments to adjust one more attributes of the same pixel in the image. The adjustment weight 240 is based on the tone value determined by the tone function 220. For example, the adjustment weight 240 ("W") can be proportional to the tone value ("T") and an adaptation coefficient ("C") that specifies an amount for the adjustment (W=C*T). The adaptation coefficient can be different for different image processing operations in which the tone component 200 is used. For brightening underexposed regions in the image, an adaptation coefficient ("$C_S$") for shadow adjustments can be one, while an adaptation coefficient ("$C_H$") for highlight adjustment can be only one-third. For darkening overexposed regions, $C_S$ can be only one-third and $C_H$ can be one. In alternative implementations, adaptation coefficients can be selected according to other schemes (such as having the same value for all tone adjustments). Optionally, one or more of the adaptation coefficients can be based on user input.

In alternative implementations, a tone component can specify an adjustment weight based on adjustment weights of other tone components. For example, a midtone component can specify a midtone adjustment weight ("$W_M$") for a midtone adjustment based on a shadow adjustment weight ("$W_S$") and a highlight adjustment weight ("$W_H$") at the same pixel. In one implementation, the adjustment weights are numbers between zero and one and the midtone tone adjustment weight is specified by a difference between one and the sum of the shadow and highlight adjustment weights (that is, $W_M = 1 - W_S - W_H$ if $W_M$ is non-negative).

The tone component can also identify in the image regions that represent the tone of the tone component. For identifying shadow regions with a shadow component, the neighborhood intensity detector calculates a neighborhood intensity value for each pixel in the image based on a neighborhood surrounding the pixel, and a shadow tone function specifies shadow tone values for each pixel based on the calculated neighborhood intensities. The shadow regions can be identified in the image as regions in which each pixel has a shadow tone value above a predetermined threshold. Regions for any other tone can be identified by the tone component corresponding to that tone. Alternatively, regions for one tone can be identified by a tone component corresponding to another but related tone. For example, highlight regions can be identified by the shadow component as pixels whose shadow tone value is below another predetermined threshold.

Figure 3:
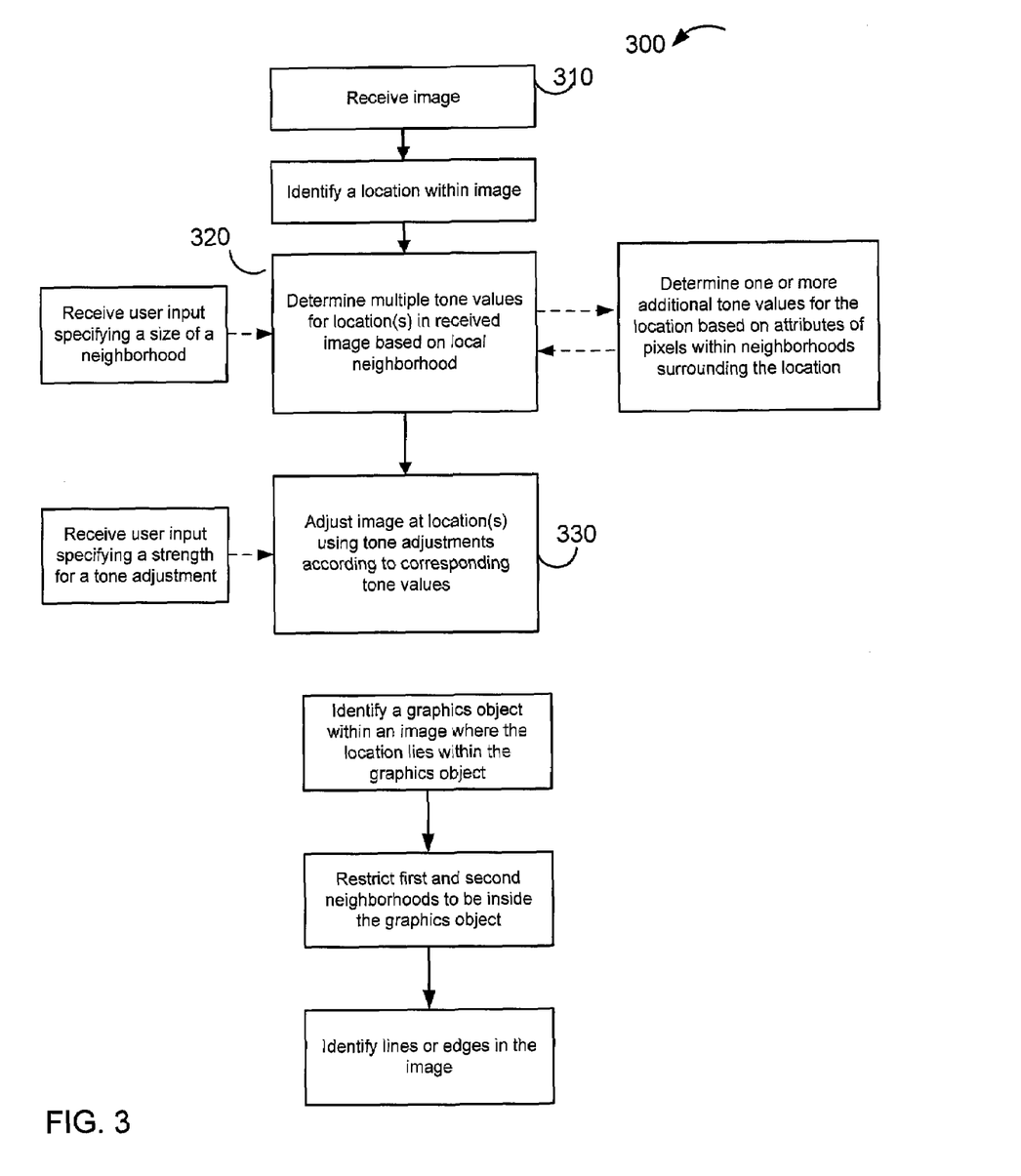
FIGS. 3 and 4 are schematic flow diagrams illustrating methods for tone selective adjustments.

FIG. 3 illustrates a method 300 for tone selective adjustment in an electronic image. The method 300 can be performed in a system for image processing including an image processor such as the image processor 100 for tone selective adjustment (FIG. 1).

The system receives an electronic image (step 310). The image can be received from an electronic device (such as a scanner or a digital camera), a local storage device (such as a memory unit or a disk drive) or a remote source through a computer network such as the Internet. The received image can be a digital image. Alternatively, the received image can be an analog image and the system can digitize the image or use analog image processing devices.

For each of one or more locations in the received image, the system determines two or more tone values based on local attributes of pixels within one or more neighborhoods of the location (step 320). In one implementation, the system determines tone values for each pixel in the received image. Alternatively, the system can determine tone values for a subset of pixels that are selected based on user input or by analyzing the image. For example, the system can identify graphics objects such as geometrical shapes or regions defined by lines or edges in the image, and determine tone values only for pixels in the identified graphics object. Optionally, tone values can be determined for locations between pixels.

For a location in the image, each tone value corresponds to a particular tone and specifies on a scale (such as between zero and one) how much a neighborhood surrounding the location can be characterized by the particular tone. For example, the system can determine a shadow tone value and/or a highlight tone value based on luminance in a neighborhood surrounding the location in the image. The system also can determine other tone values based on luminance (such as tone values for deep-shadow, mid-shadow, light-shadow, midtone, dark-highlight, mid-highlight or bright-highlight). Furthermore, one or more tone values can be based on chromacity in the neighborhood. The tone values can be determined using tone functions such as the tone function 220 (FIG. 2). Exemplary tone functions are illustrated in FIGS. 5A and 5B. Optionally, the system can determine one or more tone values based on other tone values.

According to the tone values determined for a location, the system uses corresponding tone adjustments to adjust the image at the location (step 330). The system specifies a tone adjustment for each tone and uses the specified tone adjustments in accordance with the corresponding tone value.

In one implementation, the system adjusts a local attribute ("la"), such as a color component, at the location using a shadow adjustment ("$A_S$"), a highlight adjustment ("$A_H$") and a midtone adjustment ("$A_M$"). For the tones of shadow, highlight and midtone, the system specifies adjustment weights $W_S$, $W_H$ and $W_M$ based on the shadow ("$T_S$"), highlight ("$T_H$") and midtone ("$T_M$") tone values, respectively. For example, each adjustment weight can be a product of an adaptation coefficient and the corresponding tone value, as discussed above with reference to FIG. 2. To adjust the local attribute at the location, the system can apply a total adjustment of $$W_S \cdot A_S(la) + W_H A_H(la) + W_M A_M(la).$$

To apply the total adjustment, the system can apply the shadow, highlight and midtone adjustments according to their corresponding adjustment weights sequentially. Alternatively, the system can first determine a total mapping based on the adjustment weights and attribute mappings corresponding to the tone adjustments $A_S$, $A_H$ and $A_M$, and use the total mapping to apply the total adjustment. Or the system can specify tones other than shadow, highlight or midtone, and tone adjustments can adjust local attributes other than color (such as gray-levels or saturation). Tone adjustments are further discussed with reference to FIGS. 6A and 6B.

Figure 4:
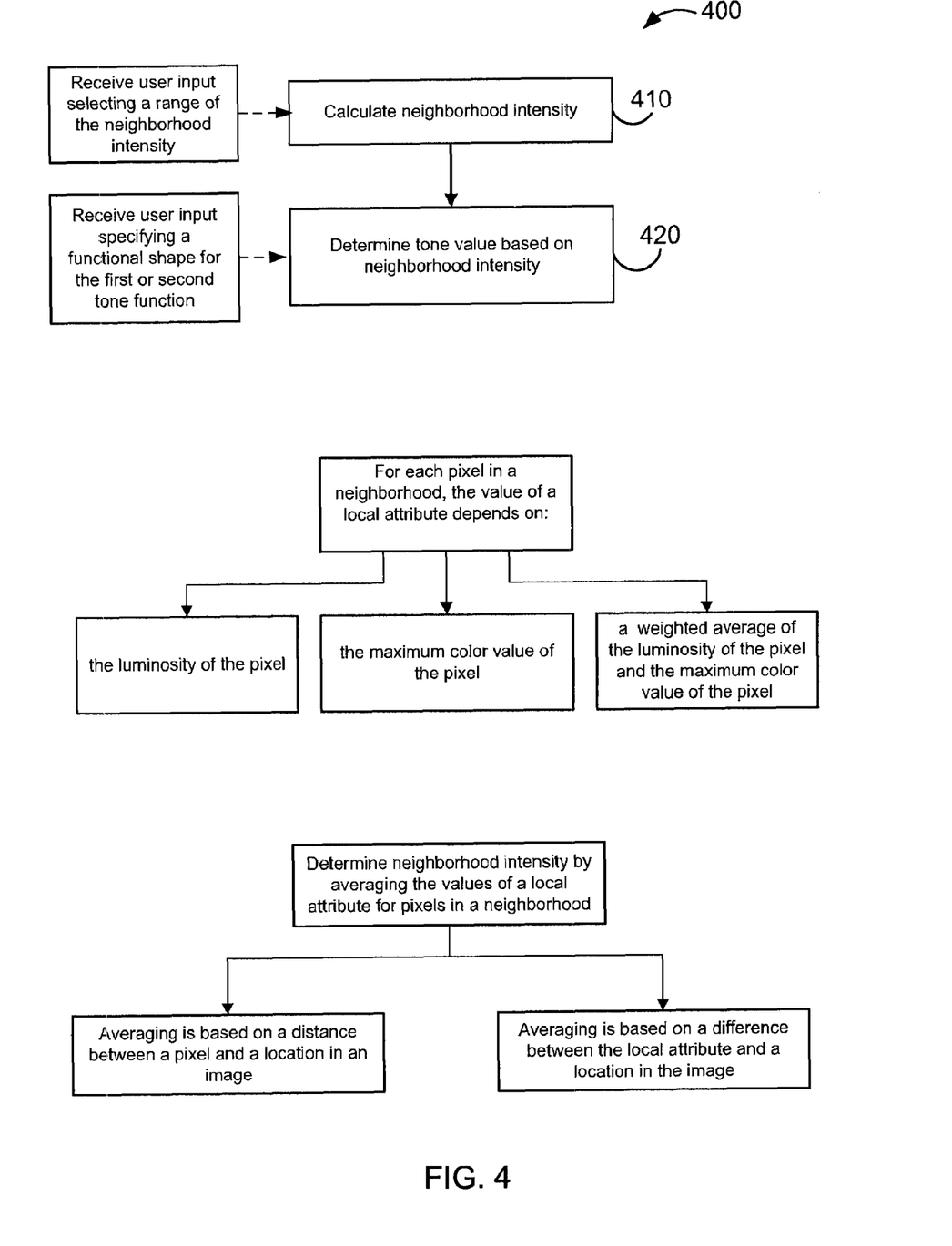

FIG. 4 illustrates a method 400 for determining a tone value for a location in an electronic image based on a neighborhood surrounding the location. The method 400 can be performed in a system for image processing including an image processor such as the image processor 100 for tone selective adjustment (FIG. 1). To determine multiple tone values for a single location, the method 400 can be repeated multiple times.

The system calculates a neighborhood intensity for the location in the image (step 410). The neighborhood intensity is a measure of a graphical attribute of pixels in a neighborhood surrounding the location. In one implementation, the neighborhood intensity measures luminosities of pixels in the neighborhood. For a pixel specifying red ("R"), green ("G") and blue ("B") color values (that is, in RGB color space), the luminosity ("L") of the pixel can be defined as $$L = 0.30R + 0.59G + 0.11B.$$

In other color spaces (such as in L*a*b* color space), the pixels in the neighborhood can explicitly specify the luminosity. In an alternative implementation, the neighborhood intensity can measure other local attributes, such as a maximum color value ("Vmax") of a pixel in the neighborhood (for R, G and B color values, Vmax=Maximum[R, G, B]).

The neighborhood intensity can be based on a local attribute that is a blend of multiple attributes, such as a luminosity L and a maximum color value Vmax of a pixel. A blended attribute ("Blend") can be defined for the neighborhood intensity using a blend parameter ("b") between zero and one as $$\text{Blend} = (1-b)\text{Vmax} + bL.$$

For example, the blend parameter b can have a value of about 0.5.

By using the blended attribute Blend, the system can produce a reasonable perceptual measure of brightness intensity. In RGB space, if the neighborhood intensity is defined only based on the luminosity L, a saturated red color (1, 0, 0) has less intensity than a gray value (0.31, 0.31, 0.31). Perceptually, however, the saturated red color is brighter than the gray value. On the other hand, if the local attribute is defined for the neighborhood intensity only by the maximum component value Vmax, the colors red, green and blue are treated identically despite their perceptual differences in brightness. The above blend can take into account perceptual effects of both different colors and saturation.

The neighborhood intensity can be based on the same local attribute for all tone values at a location. For example, the Blend attribute can be measured in a neighborhood to determine both shadow and highlight tone values. Alternatively, different tone values can be based on different local attributes. For example, if one or more saturation tone values are determined in addition to shadow and highlight tone values, the system can measure color saturation for the saturation tone values and luminance (or Blend) for the shadow and highlight tone values.

When determining the neighborhood intensity, the system can considers all pixels within the neighborhood on an equal footing. Alternatively, the system can assign different weights to different pixels in the neighborhood and average over the pixels (that is, sum up contributions of the pixels) according to the corresponding weights. For example, the system can assign a weight based on a distance of a pixel from the location. For a two-dimensional distance ("d") from the location in the image, the system can assign a gaussian weight ("$G_2$") to the pixel as $$G_2(d)=\exp(-0.5(d/R)^2),$$

where R is a radius characterizing a size of the neighborhood.

Near strong edges in the image, the neighborhood can be defined to avoid the strong edges in order to reduce halo artifacts. For example, the system can identify strong edges in the image and restricts the neighborhood of a location within a region defined by the identified strong edges. Or the system can assign weights to the pixels depending on fluctuations of the local attribute that is measured for the neighborhood intensity. For example, the gaussian weight $G_2(d)$ of a pixel can be modified to depend upon, in addition to the two dimensional distance d, on a third dimension that corresponds to an attribute difference ("$\Delta a$") of the local attribute at the pixel. The attribute difference $\Delta a$ measures the value of the local attribute at the pixel relative to a reference value. The reference value can be based on the local attribute at or near the location around which the neighborhood is defined. The modified gaussian weight ("$G_3$") is $$G_3(d, \Delta a)=\exp(-0.5(d/R)^2)\exp(-0.5(\Delta a/K)^2),$$

where K measures a characteristic attribute difference at which the pixel should have a decreased weight, even if the pixel has a small distance d from the location around which the neighborhood is defined.

Alternatively, the system can use a threshold to assign binary weights to pixels. For each pixel in the neighborhood, a binary weight of one or zero is assigned to the pixel if the corresponding attribute difference is smaller or larger, respectively, than the threshold. The binary weight can be directly used as a weight of the pixel for calculating the neighborhood intensity, or it can be combined with the gaussian weight $G_2$ (that is, only pixels with binary weight one are included in determining the neighborhood intensity).

Based on the neighborhood intensity, the system determines a tone value (step 420). The tone value can be determined using tone functions. In one implementation, the system defines shadow and highlight tone functions based on a generic function ("GF") of the neighborhood intensity ("I" normalized to take values between zero and one). The generic tone function depends on a shape parameter ("sh") as $$GF(I, sh)=x[1-f+fx(3-2x)], \text{ where}$$
$$x=I^{[1+f(gain-1)]},$$
$$f=(1-sh)^{2.5} \text{ and}$$
$$gain=10.$$

When the shape parameter sh is zero (and according to the above equations f=1), the neighborhood intensity I is raised on a high power ($I^{gain}$) so the generic function GF becomes a steep function at larger neighborhood intensities. Accordingly, the tone value is largest at I=1 and decays quickly towards zero for smaller neighborhood intensities. When the shape parameter sh is one (therefore f=0), the generic function GF is a linear function of the neighborhood intensity I, that is, GF(I, 1)=I. Thus, the shape parameter sh controls the shape of the generic function GF in a continuous range of shapes that vary from steep and localized to broad and linear.

Using the generic function GF, a shadow tone function ("STF") and a highlight tone function ("HTF") can be defined according to a shadow shape parameter ("Ssh") and a highlight shape parameter ("Hsh"), respectively, as $$STF(SI, Ssh)=GF(1-SI, Ssh)$$

$$HTF(HI, Hsh)=GF(HI, \bar{H}sh),$$

where the shadow neighborhood intensity SI and the highlight neighborhood intensity HI are determined according to their corresponding neighborhood (and can be different even for the same location in the image). For the same shadow and highlight shape parameters (Ssh=Hsh=sh, such as sh=0.5), the shadow and highlight tone functions are "mirrored" around the neighborhood intensity value of I=0.5. Accordingly, the shadow tone function STF provides a large shadow tone value for a small neighborhood intensity, and the highlight tone function HTF provides a large highlight tone value for large neighborhood intensity. FIGS. 5A and 5B illustrate exemplary mirrored shadow and highlight tone functions.

For defining shadow, highlight or other tone functions, the system can use other generic functions whose shape can be tuned with one or more parameters. In one implementation, the system uses a general gaussian function ("GG") that is centered at a center intensity ("Ic") and has a tonal width ("Tw"), that is, $$GG(I, Ic, Iw)=\exp(-0.5(I-Ic)^2/Tw^2).$$

For example, the system can define a midtone tone function by selecting the center intensity Ic to be at the middle of the available range of neighborhood intensity values (such as Ic=0.5 for intensities between zero and one). Other tone functions can be defined by different center intensities (for example, shadow and highlight tone functions can be centered at zero and one, respectively). Around the center intensity Ic, the tonal width Tw defines a range of intensity values for which the tonal value is substantially different from zero.

Figure 6A:
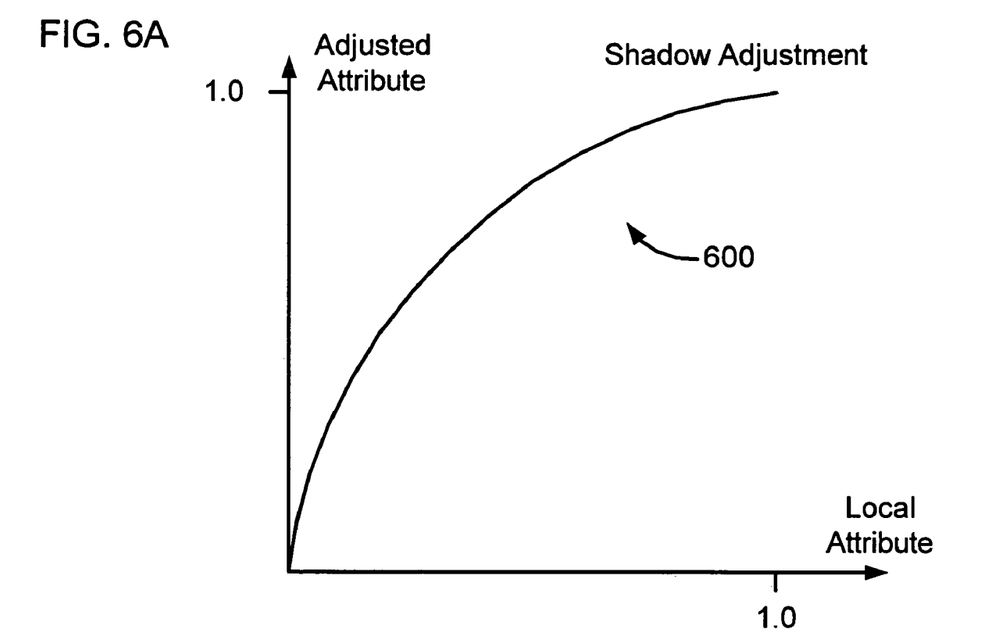
FIGS. 6A and 6B are schematic diagrams illustrating exemplary mappings for tone selective adjustments.
Figure 6B:
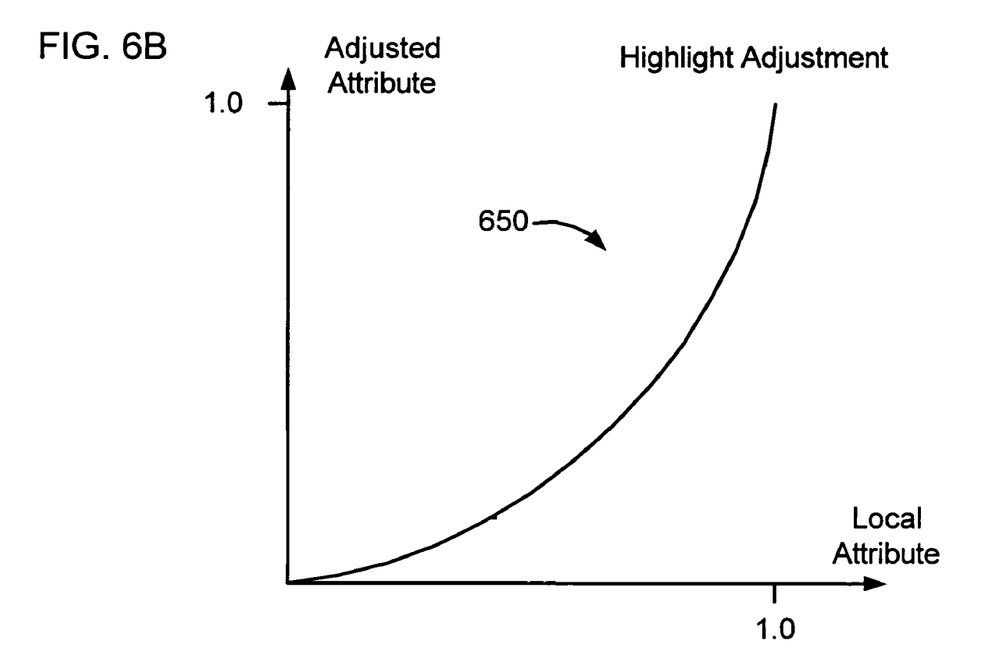

FIGS. 6A and 6B illustrate exemplary mappings for tone selective adjustment of an image at a location. FIG. 6A illustrates a shadow mapping 600 for a shadow adjustment and FIG. 6B illustrates a highlight mapping 650 for a highlight adjustment of a local attribute at the location. The mappings 600 and 650 associate initial values of the local attribute with adjusted values (in the example, the attribute values have been normalized to lie between zero and one). The local attribute can be any graphical attribute such as a color value, luminosity or saturation at the location (or a combination of such attributes).

As shown in FIG. 6A, the shadow mapping 600 is steep for small local attribute values and flat for larger values. If the shadow mapping 600 is applied on an equal footing to all pixels in the image, contrast of the local attribute (such as luminosity) would be increased for image regions with small attribute values (dark regions), and decreased for image regions with large attribute values (bright regions). In one implementation, tone selective adjustment applies the shadow mapping according to a weight that is proportional to the shadow tone value. As shown in FIG. 5A, the shadow tone value can be selected to be substantially different from zero only in neighborhoods where the intensity of the local attribute is small (in dark regions). Thus in tone selective adjustment, the shadow mapping 600 is applied mainly in dark regions where it increases contrast.

As shown in FIG. 6B, the highlight mapping 650 is flat for small local attribute values and steep for larger ones. When applied on an equal footing to all pixels in the image, the highlight mapping 650 decreases contrast of the local attribute (such as luminosity) for image regions with small attribute values (dark regions), and increases contrast for image regions with large attribute values (bright regions). In one implementation, tone selective adjustment applies the highlight mapping 650 according to a weight that is proportional to the highlight tone value. As shown in FIG. 5B, the highlight tone value can be selected to be substantially different from zero only in neighborhoods where the intensity of the local attribute is large (bright regions). Thus in tone selective adjustment, the highlight mapping 650 is applied mainly in bright regions where it increases contrast.

In one implementation, the system defines shadow and highlight adjustments based on a generic adjustment ("GA") for a local attribute. For example, a generic adjustment function $GA_1$ can be defined by auxiliary functions Screen, Interpolate2 and Interpolate3, as explained below. The Screen function can be a quadratic function of the local attribute ("la") such as $$Screen(la) = la(2-la).$$

The Interpolate2 function interpolates linearly between two values, such as x1 and x2, depending upon a blend parameter ("bp") that can have values between zero and one. For example, if the blend parameter bp is zero or one, the Interpolate2 function can return the value of x1 or x2, respectively, as described by the formula $$Interpolate2(bp, x1, x2) = (1-bp)x1 + bp\ x2.$$

The Interpolate3 function interpolates between three values, such as x1, x2 and x3, depending on a blend parameter. For example, if the blend parameter (bp) is 0, ½ or 1, the Interpolate3 function can return the value of x1, x2 or x3, respectively. The Interpolate3 function can be based on the Interpolate2 function as described by the formula $$Interpolate3(bp, x1, x2, x3) = Interpolate2(2\ bp, x1, x2)$$
if bp is less than ½ and Interpolate2(2 bp−1, x2, x3) if bp is larger or equal to ½

With these auxiliary functions, the generic adjustment function $GA_1$ can be defined to map the local attribute (la) according to an adjustment strength ("Strength") as $$GA_1(la, Strength) = Interpolate3(Strength, Sc1(la), Sc2(la), Sc3(la)),$$

where Sc1, Sc2 and Sc3 are obtained by iteratively applying the Screen function, that is, $$Sc1(la) = Screen(la), Sc2 = Screen(Sc1(la))\ \text{and}$$
$$Sc3 = Screen(Sc2(c)).$$

If the adjustment strength is zero, the generic adjustment is specified by the first iterate (Sc1) of the Screen function and the corresponding adjustment is mild. If the adjustment strength is one, the generic adjustment is specified by the third iterate (Sc3) of the Screen function and the corresponding adjustment is larger.

Alternatively, the generic adjustment GA can be defined by another generic function $GA_2$ using an exponent ("E") that is a function the adjustment strength ("Strength"), $$GA_2(la, Strength) = la^{\hat{}}E(Strength).$$

The exponent E can be a polynomial function of the adjustment strength depending on polynomial coefficients (a0, a1, a2, a3, . . . ) as $$E(Strength) = a0 + a1\ Strength + a2\ Strength\hat{}2 + a3\ Strength\hat{}3 + \ldots$$

For example, the polynomial coefficients can be selected as a0=1.0, a1=−0.5 and a2=a3= . . . =0. Accordingly, the exponent E takes the value of 1 for zero adjustment strength (Strength=0), and the corresponding linear generic function $GA_2$ specifies no adjustments to the local attribute. The exponent E decreases to 0.5 for an adjustment strength of one (Strength=1), and the corresponding generic function $GA_2$ becomes a square root function specifying large adjustments to the local attribute.

Based on the generic adjustment GA, a shadow adjustment $A_S$ and a highlight adjustment $A_H$ can be defined for adjusting a local attribute ("la," normalized to be between zero and one) such as $$A_S(la, StrengthS) = GA(la, StrengthS)\ \text{and}$$

$$A_H(la, StrengthH) = 1 - GA(1-la, StrengthH),$$

where the shadow and highlight adjustments can have different adjustment strengths StrengthS and StrengthH, respectively. Similar to the adaptation coefficients discussed above with reference to FIG. 2, the adjustment strengths can be different for different image processing operations. For correcting underexposed images, the shadow adjustment strength StrengthS can be 2/7 and the highlight adjustment strength StrengthH can be zero, and vice versa for correcting overexposed images.

For equal adjustment strengths, the shadow and highlight adjustments have a "negative symmetry." The negative symmetry refers to a negative of the image that is generated by replacing a local attribute value la with 1−la at each pixel of the image. For example, each color value c is replaced by its complementing value 1−c. According to the negative symmetry, applying the highlight adjustment is equivalent to applying the shadow adjustment on the negative image and taking a negative of the shadow-adjusted negative image. In alternative implementations, the generic adjustment GA can have other functional forms, but the negative symmetry can still apply if the shadow and highlight adjustments are constructed from the generic adjustment according to the above equations.

In addition to shadow and highlight, adjustments can be defined for other tones. For example, a midtone adjustment ("$A_M$") can be defined independently from the shadow and highlight adjustments. Alternatively, the midtone adjustment can be based on the shadow adjustment (such as $A_M = A_S$) or the highlight adjustment (such as $A_M = A_H$). If no separate control is required for midtones, a mapping for the midtone can be an identity mapping (that is, $A_M$(al)=al) that specifies no adjustment.

The invention can be implemented in digital electronic circuitry, or in computer hardware, firmware, software, or in combinations of them. The invention can be implemented as a computer program product, that is, a computer program tangibly embodied in an information carrier, such as in a machine-readable storage device or in a propagated signal, for execution by, or to control the operation of, data processing apparatus, such as a programmable processor, a computer, or multiple computers. A computer program can be written in any form of programming language, including compiled or interpreted languages and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, such as an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. Information carriers suitable for embodying computer program instructions and data include all forms of non-volatile memory, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

By way of example, a printing device implementing an interpreter for a page description language, such as the PostScript® language, includes a microprocessor for executing program instructions (including font instructions) stored on a printer random access memory (RAM) and a printer read-only memory (ROM) and controlling a printer marking engine. The RAM is optionally supplemented by a mass storage device such as a hard disk. The essential elements of a computer are a processor for executing instructions and a memory. A computer can generally also receive programs and data from a storage medium such as an internal disk or a removable disk. These elements will also be found in a conventional desktop or workstation computer as well as other computers suitable for executing computer programs implementing the methods described here, which can be used in conjunction with any digital print engine or marking engine, display monitor, or other raster output device capable of producing color or gray scale pixels on paper, film, display screen, or other output medium.

The invention has been described in terms of particular embodiments. Other embodiments are within the scope of the following claims. For example, the steps of the invention can be performed in a different order and still achieve desirable results.

What is claimed is:

1. A method for processing an image, the method comprising:
   identifying one or more neighborhood size parameters, one or more tone function shape parameters, and one or more tone adjustment strength parameters; and
   for each location of multiple locations within the image, performing tone selective adjustment, where performing tone selective adjustment comprises:
      determining a shadow neighborhood and a highlight neighborhood, each neighborhood comprising an area of the image surrounding the location that is based on at least one of the one or more neighborhood size parameters;
      determining a shadow neighborhood intensity for the shadow neighborhood, the shadow neighborhood intensity being a measure of values of a local attribute specified by pixels within the shadow neighborhood;
      determining a highlight neighborhood intensity for the highlight neighborhood, the highlight neighborhood intensity being a measure of values of a local attribute specified by pixels within the highlight neighborhood;
      determining a shadow tone value representing a characterization of a shadow tone of the neighborhood, where the shadow tone value is based on the shadow neighborhood intensity and a shadow tone function, where the shadow tone function is based on at least one of the one or more tone function shape parameters;
      determining a highlight tone value representing a characterization of a highlight tone of the neighborhood, where the highlight tone value is based on the highlight neighborhood intensity and a highlight tone function, where the highlight tone function is based on at least one of the one or more tone function shape parameters;
      determining a shadow local weight for a shadow tone adjustment based on the shadow tone value and at least one of the one or more tone strength adjustment parameters;
      determining a highlight local weight for a highlight tone adjustment based on the highlight tone value and at least one of the one or more tone strength adjustment parameters;
      adjusting the image at the location using the shadow local weight for shadow tone adjustment and the highlight local weight for highlight tone adjustment.

2. The method of claim 1, wherein:
   for each pixel in each neighborhood, the value of the local attribute depends on luminosity of the pixel.

3. The method of claim 1, wherein:
   for each pixel in each neighborhood, the value of the local attribute depends on a maximum color value of the pixel.

4. The method of claim 1, wherein:
   for each pixel in each neighborhood, the value of the local attribute is a weighted average of a luminosity and a maximum color value of the pixel.

5. The method of claim 1, wherein:
   determining each neighborhood intensity comprises averaging the values of the local attribute for pixels within the corresponding neighborhood.

6. The method of claim 5, wherein:
averaging the values of the local attribute for pixels within each neighborhood includes averaging the values of the local attribute according to gaussian weights that are assigned to each pixel in the neighborhood based upon a distance between the pixel and the location.

7. The method of claim 5, wherein:
averaging the values of the local attribute for pixels within each neighborhood includes averaging the values of the local attribute according to weights that are assigned to each pixel in the neighborhood based upon a difference between the local attribute at the pixel and the location.

8. The method of claim 1, further comprising:
receiving user input selecting a range of neighborhood intensity values for which the shadow or highlight tone value is substantially different from a reference value.

9. The method of claim 1, wherein:
the tone function is a generic function or a general Gaussian function.

10. The method of claim 1, wherein:
the shadow neighborhood and the highlight neighborhood are substantially identical.

11. The method of claim 1, further comprising:
for each location of one or more of the multiple locations, performing the following operations:
  identifying a graphics object within the image, the location lying inside the graphics object; and
  restricting the shadow and highlight neighborhoods for the location inside the graphics object.

12. The method of claim 11, wherein:
identifying the graphics object includes identifying lines or edges in the image.

13. The method of claim 1, further comprising:
determining one or more additional tone values for the location, each of the additional tone values specifying a local weight for a corresponding tone adjustment in the image; and
wherein adjusting the image at the location includes using each of the additional tone adjustments according to the corresponding tone value.

14. The method of claim 13, wherein:
at least one of the additional tone values is determined based on the shadow and highlight tone values.

15. The method of claim 1, wherein the shadow and highlight tone adjustments are related to each other by a negative symmetry.

16. A system for image processing, the system comprising:
a local adjustment tool to adjust an image including a plurality of pixels, the local adjustment tool including a shadow tone component and a highlight tone component, wherein:
  each of the shadow and highlight tone components is operable to determine a tone value and a corresponding local weight for adjustment for a location in the image by performing operations comprising:
    determining a neighborhood comprising an area of the image surrounding the location that is based on at least one of one or more neighborhood size parameters;
    determining a neighborhood intensity, the neighborhood intensity being a measure of values of a local attribute specified by pixels within the neighborhood;
    determining a tone value for the location, the tone value representing a characterization of a tone of the neighborhood, where the tone value is based on the neighborhood intensity and a tone function, where the tone function is based on at least one of one or more tone function shape parameters; and
    determining a local weight for a tone adjustment based on the tone value and at least one of one or more tone strength adjustment parameters;
  the local adjustment tool is operable to adjust the image at a location using the corresponding local weights determined by each of the shadow and highlight tone components according to the local weight specified by the corresponding tone value.

17. The system of claim 16, further comprising:
an image capturing device to generate the image.

18. The system of claim 17, wherein the image capturing device includes a digital camera or a scanner.

19. The system of claim 16, further comprising:
a display device to display the image.

20. The system of claim 19, wherein the display device is implemented in a portable device.

21. The system of claim 16, wherein at least one of the tone components specifies an adjustment parameter for the corresponding tone adjustment, the system further comprising:
a user interface to set a value for the adjustment parameter.

22. A computer readable storage device storing a computer program of instructions which, when executed by a computer processing apparatus, cause the apparatus to perform a method for processing an image comprising:
identifying one or more neighborhood size parameters, one or more tone function shape parameters, and one or more tone adjustment strength parameters; and
for each location of multiple locations within the image, performing tone selective adjustment, where performing tone selective adjustment comprises:
  determining a shadow neighborhood and a highlight neighborhood, each neighborhood comprising an area of the image surrounding the location that is based on at least one of the one or more neighborhood size parameters;
  determining a shadow neighborhood intensity for the shadow neighborhood, the shadow neighborhood intensity being a measure of values of a local attribute specified by pixels within the shadow neighborhood;
  determining a highlight neighborhood intensity for the highlight neighborhood, the highlight neighborhood intensity being a measure of values of a local attribute specified by pixels within the highlight neighborhood;
  determining a shadow tone value representing a characterization of a shadow tone of the neighborhood, where the shadow tone value is based on the shadow neighborhood intensity and a shadow tone function, where the shadow tone function is based on at least one of the one or more tone function shape parameters;
  determining a highlight tone value representing a characterization of a highlight tone of the neighborhood, where the highlight tone value is based on the highlight neighborhood intensity and a highlight tone function, where the highlight tone function is based on at least one of the one or more tone function shape parameters;
  determining a shadow local weight for a shadow tone adjustment based on the shadow tone value and at least one of the one or more tone strength adjustment parameters;

determining a highlight local weight for a highlight tone adjustment based on the highlight tone value and at least one of the one or more tone strength adjustment parameters;

adjusting the image at the location using the shadow local weight for shadow tone adjustment and the highlight local weight for highlight tone adjustment.

23. The computer readable storage device of claim 22, wherein:

for each pixel in each neighborhood, the value of the local attribute depends on luminosity of the pixel.

24. The computer readable storage device of claim 22, wherein:

for each pixel in each neighborhood, the value of the local attribute depends on a maximum color value of the pixel.

25. The computer readable storage device of claim 22, wherein:

for each pixel in each neighborhood, the value of the local attribute is a weighted average of a luminosity and a maximum color value of the pixel.

26. The computer readable storage device of claim 22, wherein:

determining each neighborhood intensity comprises averaging the values of the local attribute for pixels within the corresponding neighborhood.

27. The computer readable storage device of claim 26, wherein:

averaging the values of the local attribute for pixels within each neighborhood includes averaging the values of the local attribute according to gaussian weights that are assigned to each pixel in the neighborhood based upon a distance between the pixel and the location.

28. The computer readable storage device of claim 26, wherein:

averaging the values of the local attribute for pixels within each neighborhood includes averaging the values of the local attribute according to weights that are assigned to each pixel in the neighborhood based upon a difference between the local attribute at the pixel and the location.

29. The computer readable storage device of claim 22, further comprising instructions operable to cause one or more data processing apparatus to perform operations comprising:

receiving user input selecting a range of neighborhood intensity values for which the shadow or highlight tone value is substantially different from a reference value.

30. The computer readable storage device of claim 22, wherein:

the tone function is a generic function or general Gaussian function.

31. The computer readable storage device of claim 22, wherein:

the shadow neighborhood and the highlight neighborhood are substantially identical.

32. The computer readable storage device of claim 22, wherein the method further comprises:

for each location of one or more of the multiple locations, performing the following operations:

identifying a graphics object within the image, the location lying inside the graphics object; and restricting the shadow and highlight neighborhoods for the location inside the graphics object.

33. The computer readable storage device of claim 32, wherein:

identifying the graphics object includes identifying lines or edges in the image.

34. The computer readable storage device of claim 22, wherein the method further comprises:

determining one or more additional tone values for the location, each of the additional tone values specifying a local weight for a corresponding tone adjustment in the image; and wherein adjusting the image at the location includes using each of the additional tone adjustments according to the corresponding tone value.

35. The computer readable storage device of claim 34, wherein:

at least one of the additional tone values is determined based on the shadow and highlight tone values.

36. The computer readable storage device of claim 22, wherein the shadow and highlight tone adjustments are related to each other by a negative symmetry.

37. The system of claim 17, wherein the image capturing device includes a CCD device.

38. The system of claim 17, wherein the local adjustment tool is configured to provide feedback to the image capturing device.

39. The system of claim 38, wherein the image capturing device is configured to locally adjust sensitivity based on the feedback to generate an adjusted image.

40. The system of claim 20, wherein the portable device includes a personal digital assistant, a mobile phone, or both.

41. The system of claim 40, wherein at least a portion of the local adjustment tool is implemented in a remote server.

42. The system of claim 20, wherein the local adjustment tool is implemented in the portable device.

\* \* \* \* \*

UNITED STATES PATENT AND TRADEMARK OFFICE
CERTIFICATE OF CORRECTION

PATENT NO. : 7,412,105 B2 Page 1 of 1
APPLICATION NO. : 10/678366
DATED : August 12, 2008
INVENTOR(S) : Gregg D. Wilensky It is certified that error appears in the above-identified patent and that said Letters Patent is hereby corrected as shown below:

On the Title Page, Item -56- REFERENCES CITED
right column, line 1:
delete "Sao et al.", and replace with --Kim et al.--

Signed and Sealed this

Twenty-fourth Day of February, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,412,105 B2 | Page 1 of 1 |
| APPLICATION NO. | : 10/678366 | |
| DATED | : August 12, 2008 | |
| INVENTOR(S) | : Gregg D. Wilensky | |

It is certified that error appears in the above-identified patent and that said Letters Patent is hereby corrected as shown below:

On the Title Page, Item -56- REFERENCES CITED
        right column, line 1:
            delete "Seo et al.", and replace with --Kim et al.--

This certificate supersedes the Certificate of Correction issued February 24, 2009.

Signed and Sealed this
Nineteenth Day of February, 2013

Teresa Stanek Rea
*Acting Director of the United States Patent and Trademark Office*